United States Patent [19]

Kennon et al.

[11] Patent Number: 5,082,369
[45] Date of Patent: Jan. 21, 1992

[54] OPTICAL PROBE TEST PORT

[75] Inventors: Jerry M. Kennon; Ronald B. Via, both of Wake, N.C.

[73] Assignee: ABB Power T&D Company, Blue Bell, Pa.

[21] Appl. No.: 397,825

[22] Filed: Aug. 24, 1989

[51] Int. Cl.⁵ .............................................. G01J 1/02
[52] U.S. Cl. .................................................. 356/243
[58] Field of Search ........................... 356/243, 445; 250/227.11

[56] References Cited

U.S. PATENT DOCUMENTS 4,736,100 4/1988 Vastagh ........................ 356/73.1 X Primary Examiner—Davis L. Willis
Assistant Examiner—Matthew W. Koren
Attorney, Agent, or Firm—A. J. Rossi

[57] ABSTRACT

A device for use in the testing of an optical probe which has at least one optical transmitter/receiver pair composed of one optical transmitter for emitting optical energy along a first path and one optical receiver for receiving optical energy propagated along a second path, the device including: a housing (4,6) formed to be mechanically coupled with the probe and having at least one pair of passages (14), with each passage (14) extending along a respective one of the first and second paths; and at least one optical energy reflecting member (18) disposed in the housing (4,6) and positioned relative to the passages (14) of the pair such that, when the housing (4,6) is coupled to the probe, light propagated along the first path from the transmitter is reflected by the reflecting member (18) into the second path toward the receiver.

25 Claims, 1 Drawing Sheet

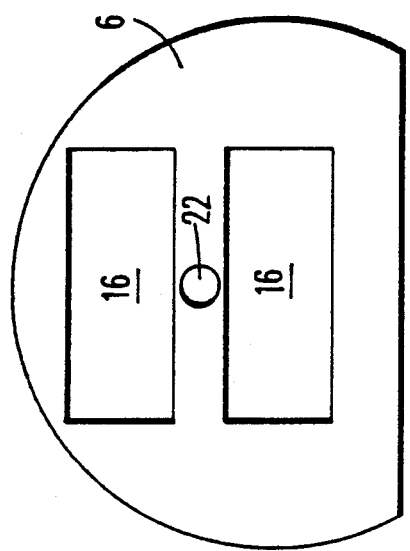
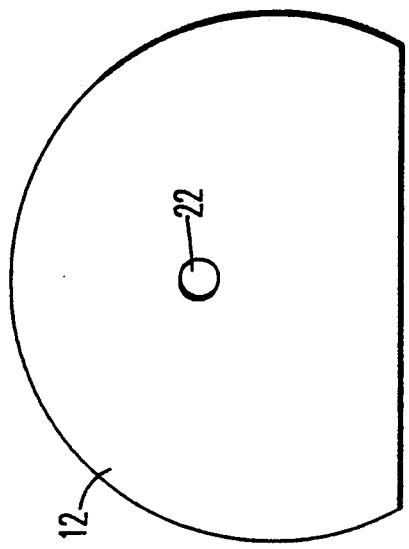
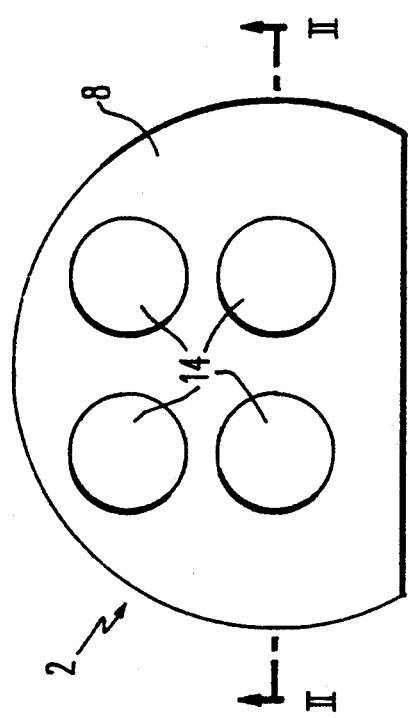
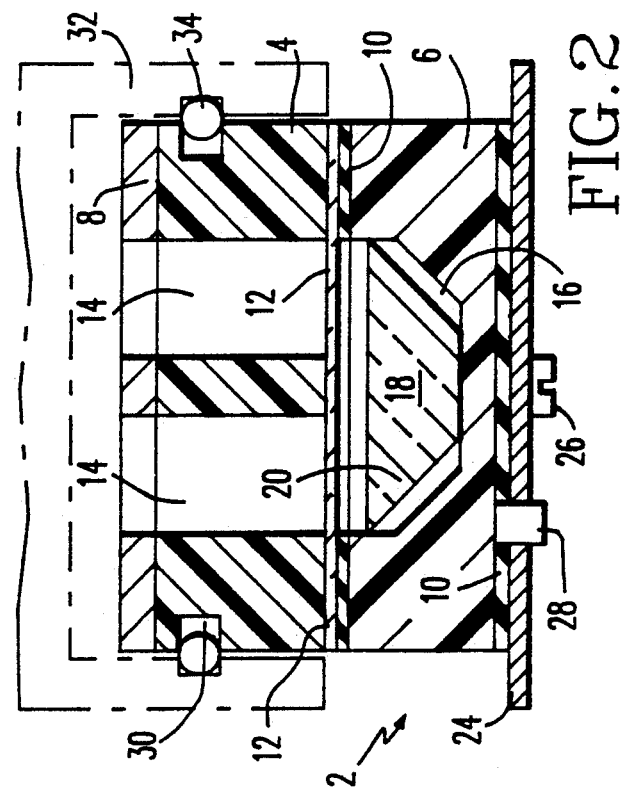

OPTICAL PROBE TEST PORT

BACKGROUND OF THE INVENTION

The present invention relates to optical probes of the type utilized in optical communication systems to interrogate, for example, data gathering devices such as electrical utility energy meters.

Utility meters which have been recently introduced include optical communications systems for outputting data relating to the energy being metered and for receiving control signals, including interrogation signals instructing the meter to output data information and programming control signals for instructing the meter to perform various functions.

Communications with the meter may be performed with a hand-held computer device equipped with a probe having optical transmitters and receivers disposed to mate with the optical components provided on the meter. Typically, such systems operate with infrared energy.

Whenever it is not possible to obtain a reading from a meter, it is desirable to be able to quickly determine whether the malfunction is in the meter or in the reading device. Moreover, since it is of importance to obtain accurate readings, it would be desirable to be able to verify the operability of the reading device from time to time in the field.

SUMMARY OF THE INVENTION

It is a primary object of the present invention to permit the self-testing of such optical reading devices.

Another object of the invention is to provide a structurally simple attachment which will enable testing procedures to be performed.

A further object of the invention is to provide testing procedures capable of verifying the correct transmission of signals, the integrity of circuit components and connections and the condition of the probe battery.

The above and other objects are achieved, according to the present invention, by a method and device for use in the testing of an optical probe which has at least one optical transmitter/receiver pair composed of one optical transmitter for emitting optical energy along a first path and one optical receiver for receiving optical energy propagated along a second path, the device including: a housing formed to be mechanically coupled with the probe and having at least one pair of passages, with each passage extending along a respective one of the first and second paths; and at least one optical energy reflecting means disposed in the housing and positioned relative to the passages of the pair such that, when the housing is coupled to the probe, light propagated along the first path from the transmitter is reflected by the reflecting means into the second path toward the receiver.

BRIEF DESCRIPTION OF THE DRAWING

FIG. 1 is a plan view of a preferred embodiment of a test port according to the invention.

FIG. 2 is a cross-sectional view taken along the line II—II of FIG. 1.

FIG. 3 is a plan view of one component of the device shown in FIG. 2.

FIG. 4 is a plan view of a further component of the device shown in FIG. 2.

DESCRIPTION OF THE PREFERRED EMBODIMENTS

FIGS. 1 and 2 illustrate a test port 2 according the present invention composed of an upper plastic part 4, a lower plastic part 6, a plate of magnetizable metal 8 secured to plastic part 4, two gaskets 10, and a transparent window disk 12.

The illustrated embodiment is constructed to mate with a probe conforming to ANSI Standard C12.13. The probe in question is provided with two pairs of IR transmitters and receivers.

In the port shown in FIGS. 1 and 2, part 4 and plate 8 are provided with openings defining four passages 14 each arranged to be aligned with a respective IR transmitter or receiver of the associated probe. Part 6 is provided with two recesses 16 of rectangular cross section, as is additionally shown in FIG. 3.

Each recess houses a respective prism 18 having two inclined reflecting surfaces 20 inclined relative to one another so that both surfaces 20 together effect a 180° reflection. Each prism 18 is aligned with a respective pair of passages 14 so that light entering one passage of a pair will be reflected back along the other passage of that pair. Each prism 18 may be cemented into its respective recess 16. The gasket 10 which is located between parts 4 and 6 may have the same outline as that shown for part 6 in FIG. 3 and that gasket acts together with window 12 to prevent moisture from entering recesses 16. Window 12 may have the outline shown in FIG. 4.

Part 6, gaskets 10 and window 12 are each provided with an opening 22 for receiving a screw which holds the parts together and secures the port to a mounting wall 24, which may be any suitable part of the reading device with which the probe is associated. Wall 24 could also be part of a meter. Correspondingly, part 4 is provided with a blind bore (not shown) for receiving the screw, the screw being shown at 26 in FIG. 2. Port 2 may additionally be provided with a positioning pin 28, as also shown in FIG. 2.

The external dimensions of port 2 are selected to receive, as shown in broken lines in FIG. 2, a sleeve 32 which surrounds the output end of a probe and which protrudes axially from the transmitters and receivers provided in the probe. Sleeve 32 includes, at its interior surface, a detent arrangement 34 which will be received in an annular recess 30 provided at the periphery of part 4. Detent arrangement 34 could be composed of several balls retained in an annular recess and urged radially inwardly by resilient biassing springs.

Probes of the type under consideration additionally include a magnet which will be attracted to magnetizable plate 8 in order to hold the probe in the desired position relative to port 2.

The type of probe which can be tested with the aid of the optical port illustrated in FIGS. 1-4 has two optical transmitters and two optical receivers. The transmitters provide, respectively, a strobe, or synchronizing, output and a data output. The receivers are intended to receive, respectively, a strobe, or synchronizing, input and a data input.

When the probe is coupled to a meter having complementary optical receivers and transmitters, data in the form of a binary signal will be emitted by the data output transmitter. Each bit of the binary signal will be preceded by a pulse supplied by the strobe output transmitter, which informs the circuitry in the meter that a data bit is about to be received from the reading device. Typically, the data signal constitutes an instruction to the meter to deliver energy usage data to the probe. When such an instruction is received, the meter will supply to the data input receiver of the probe a binary signal containing this information. Each bit of the binary signal will be preceded by a pulse delivered to the strobe input receiver of the probe to inform the reading device connected to the probe that a data bit is about to be received from the meter.

For testing a probe with the aid of the test port according to the invention, the reading device associated with the probe may be connected to either a parallel port or a serial port of a computer. When connected to a parallel computer port, each IR transmitter is activated in turn and the associated receiver is monitored to compare the signal delivered by the transmitter with the signal detected by the receiver. If the signal delivered to each transmitter is the same as that appearing at the output of its associated receiver, then it can be concluded that the probe transmitting and receiving devices and their associated circuits are operating properly.

If such a probe is provided with serial interface circuitry, the reading device would be connected to a serial port of a computer, which is set for duplex operation. Then, an 8-bit code may be sent via the transmitter associated with the serial interface and a determination is made as to whether the signal arriving at the corresponding probe IR receiver has the same bit pattern. Then, to complete the test, the code is inverted and retransmitted, and the signal detected by the associated IR receiver is monitored to determine whether it contains the same bit pattern. This test should be made at the highest baud rate required by the communications system.

In addition, during testing with the aid of a serial computer port, both IR transmitters can be activated simultaneously for approximately 0.5 second, with the signals detected by both receivers being monitored. A failure noted during this test could be an indication that the batteries powering the probe are weak.

Furthermore, since the test port according to the invention is constructed to mate with a selected probe, and in particular a probe having a sleeve which can fit around the port, and since the probe and the port would be held together by a detent arrangement and a magnetic force, the test port according to the present invention can also be used to hold the probe in a storage position when not in use.

Given that existing communications technology offers the possibility of combining synchronizing information and data in a single channel, which would mean that a probe would require only a single transmitter and a single receiver arranged to cooperate with a single receiver and a single transmitter installed in the meter. The present invention contemplates test port embodiments having a single pair of passages 14 and a single reflecting device 18 providing a single pair of reflecting surfaces 20 for use with such a probe.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A device for use in the testing of an optical probe which has at least one optical transmitter/receiver pair composed of one optical transmitter for emitting optical energy along a first path and one optical receiver for receiving optical energy propagated along a second path, said device comprising: a housing formed to be mechanically coupled with the probe and having at least one pair of passages, with each passage extending along a respective one of the first and second paths; and at least one optical energy reflecting means disposed in said housing and positioned relative to said passages of said pair such that, when said housing is coupled to the probe, light propagated along the first path from the transmitter is reflected by said reflecting means into said second path toward the receiver, and wherein the probe has two such transmitter/receiver pairs, and said device has two said pairs of passages each associated with the light paths of a respective transmitter/receiver pair and two said reflecting means each positioned relative to a respective pair of passages.

2. A device as defined in claim 1 wherein the first and second paths of each said transmitter/receiver pair are parallel to one another, said two passages of each said transmitter/receiver pair extend parallel to one another, and each of said two reflecting means have two reflecting surfaces each intersecting a respective path when said housing is coupled to the probe.

3. A device as defined in claim 2 wherein each said reflecting surface of each of said two reflecting means forms an angle of 45° with its respective path.

4. A device as defined in claim 2 wherein each of said two reflecting means comprise a prism.

5. A device as defined in claim 1 further comprising securing means for retaining the probe in a defined position relative to said housing.

6. A device as defined in claim 5 wherein the probe has a hollow sleeve extending along the first and second paths of each of said two pairs of passages and said housing is configured to mate with the sleeve when the probe is in the defined position relative to said housing.

7. A device as defined in claim 6 wherein the probe sleeve has an interior wall provided with a detent device and said housing has a detent recess constituting part of said securing means for receiving the detent device when the probe is in the defined position relative to said housing.

8. A device as defined in claim 1 wherein the probe is part of a reading unit and further comprising means for fastening said device to the unit.

9. A device for use in the testing of an optical probe which has at least one optical transmitter/receiver pair composed of one optical transmitter for emitting optical energy along a first path and one optical receiver for receiving optical energy propagated along a second path, said device comprising: a housing formed to be mechanically coupled with the probe and having at least one pair of passages, with each passage extending along a respective one of the first and second paths; at least one optical energy reflecting means disposed in said housing and positioned relative to said passages of said pair such that, when said housing is coupled to the probe, light propagated along the first path from the transmitter is reflected by said reflecting means into said second path toward the receiver; and securing means for retaining the probe in a defined position relative to said housing, and wherein the probe includes a magnet and said securing means comprises a member made of magnetizable material located to be magnetically coupled with the magnet when the probe is in the defined position relative to said housing.

10. A device as defined in claim 9 wherein the probe has a hollow sleeve extending along the first and second paths and said housing is configured to mate with the sleeve when the probe is in the defined position relative to said housing.

11. A device as defined in claim 10 wherein the probe sleeve has an interior wall provided with a detent device and said housing has a detent recess constituting part of said securing means for receiving the detent device when the probe is in the defined position relative to said housing.

12. A device as defined in claim 9 wherein the first and second paths are parallel to one another, said two passages extend parallel to one another, and said reflecting means have two reflecting surfaces each intersecting a respective path when said housing is coupled to the probe.

13. A device as defined in claim 12 wherein each said reflecting surface forms an angle of 45° with its respective path.

14. A device as defined in claim 12 wherein said reflecting means comprise a prism.

15. A device as defined in claim 9 wherein the probe has a hollow sleeve extending along the first and second paths and said housing is configured to mate with the sleeve when the probe is in the defined position relative to said housing.

16. A device as defined in claim 15 wherein the probe sleeve has an interior wall provided with a detent device and said housing has a detent recess constituting part of said securing means for receiving the detent device when the probe is in the defined position relative to said housing.

17. A device for use in the testing of an optical probe which has at least one optical transmitter/receiver pair composed of one optical transmitter for emitting optical energy along a first path and one optical receiver for receiving optical energy propagated along a second path, said device comprising: a housing formed to be mechanically coupled with the probe and having at least one pair of passages, with each passage extending along a respective one of the first and second paths; at least one optical energy reflecting means disposed in said housing and positioned relative to said passages of said pair such that, when said housing is coupled to the probe, light propagated along the first path from the transmitter is reflected by said reflecting means into said second path toward the receiver; and a sheet of material which is transparent to the optical energy extending across said passages and covering said reflecting means.

18. A device as defined in claim 17 further comprising means including said sheet for sealing said reflecting means against moisture.

19. A device as defined in claim 17 wherein the first and second paths are parallel to one another, said two passages extend parallel to one another, and said reflecting means have two reflecting surfaces each intersecting a respective path when said housing is coupled to the probe.

20. A device as defined in claim 19 wherein each said reflecting surface forms an angle of 45° with its respective path.

21. A device as defined in claim 19 wherein said reflecting means comprise a prism.

22. A device as defined in claim 17 further comprising securing means for retaining the probe in a defined position relative to said housing.

23. A device as defined in claim 22 wherein the probe has a hollow sleeve extending along the first and second paths and said housing is configured to mate with the sleeve when the probe is in the defined position relative to said housing.

24. A device as defined in claim 23 wherein the probe sleeve has an interior wall provided with a detent device and said housing has a detent recess constituting part of said securing means for receiving the detent device when the probe is in the defined position relative to said housing.

25. A device as defined in claim 17 wherein the probe is part of a reading unit and further comprising means for fastening said device to the unit.

* * * * *